G. E. HEYL & T. T. BAKER.
FUEL MIXTURE.
APPLICATION FILED MAR. 14, 1913.
1,081,739.
Patented Dec. 16, 1913.
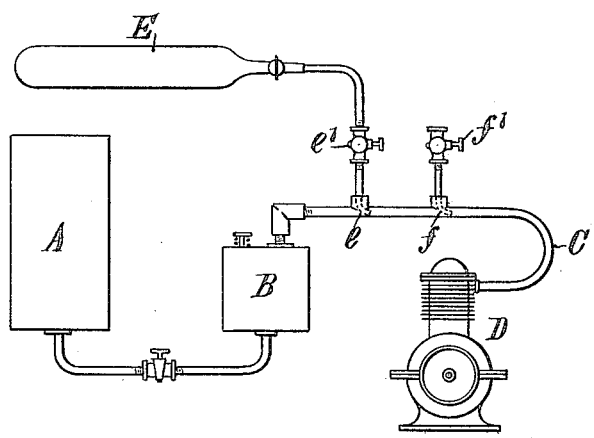
WITNESSES:
John C. Sanders
Albert F. Houman
INVENTORS:
George Edward Heyl
Thomas Thorne Baker
BY Mr. Wallace White
ATTY.

UNITED STATES PATENT OFFICE.

GEORGE EDWARD HEYL AND THOMAS THORNE BAKER, OF STRAND, LONDON, ENGLAND.

FUEL MIXTURE.

1,081,739.  Specification of Letters Patent.  Patented Dec. 16, 1913.

Application filed March 14, 1913. Serial No. 754,251.

*To all whom it may concern:*

Be it known that we, GEORGE EDWARD HEYL and THOMAS THORNE BAKER, subjects of the King of Great Britain, residing at Garrick House, Southampton street, Strand, London, England, have invented new and useful Improvements in Fuel Mixtures, of which the following is a specification.

This invention relates to improvements in fuel for use in internal-combustion engines and in the proportioning of the supply therewith of air necessary for the purpose of obtaining a more efficient explosive mixture in the cylinder of the engine than has hitherto been possible.

We have found that if the combustible mixture is permeated with a modicum of free hydrogen gas the inflammability thereof is so much increased that mixtures so diluted with air as to be not easily ignitible under the conditions which have hitherto obtained, can, by the presence of the free hydrogen gas, be ignited with facility and efficiently consumed.

Under the normal conditions which have hitherto obtained, a supply of liquid-fuel which is volatile at the prevalent atmospheric temperature is requisite to start an internal combustion engine into motion from the cold condition without delay, and when the engine becomes heated the amount of such fuel which is conveyed with the air drawn into the cylinder of the engine is normally greatly in excess of that which can be completely consumed by the oxygen of the air whereby it is conveyed.

By virtue of the greatly increased inflammability of the combustible charge of an internal-combustion engine in the present invention which is due to the use of added traces of free hydrogen gas, liquid-fuels, such as alcohol and hydrocarbons for example, which are less volatile than gasolene or petrol, can be substituted therefor to feed the engines of motor-cars which are required to start without delay. A charge derived from such a liquid at normal atmospheric temperature will necessarily be very dilute but by the presence of the free hydrogen gas it will be as readily ignitible as the much richer charge which is derivable from the most volatile spirit hitherto used.

The augmented inflammability of the charge due to the presence of free hydrogen will enable a charge which is very much diluted with air to be ignited with certainty and burnt with an efficiency which is not attainable under present conditions. The increased inflammability due to the presence of a trace of free hydrogen gas in the mixture of the energy-providing combustible may be due to catalysis or to the fact that free hydrogen and free oxygen by direct combination are able to propagate a flame throughout the entire mass without requiring an expenditure of energy to first dissociate the elements of the chemical compound which constitutes the hydro-carbon or other fuel ordinarily in use which, under present conditions is essential to the propagation of the flame. There may be some other explanation of the greatly augmented efficiency of hydrogenated fuel of which we are unaware.

It is essential that, in order to secure the greatest possible increase of efficiency due to this invention, the fuel be provided with much more air than would enable it to be readily ignited in the absence of the permeating free hydrogen gas.

Liquid-fuels composed of gasolene, petrol, petroleum, less volatile or heavy oils, benzin, alcohol or other like combustibles are able to absorb and retain, under normal atmospheric conditions of temperature and pressure, a sufficient quantity of hydrogen to provide to the charge delivered therefrom to the cylinder of the engine the requisite modicum of hydrogen to effect the desired ignition and inflammation of the charge but, alternatively to the use of such hydrogenated fuel or in conjunction therewith, free hydrogen gas may be admitted to the induction pipe leading to the cylinder of the engine to mix with the carbureted air drawn through the carbureter. Such added hydrogen gas is provided from a vessel containing compressed hydrogen gas and with the use thereof means are provided for the supply of extra air containing sufficient oxygen for the consumption of the hydrogen.

By the use of the present invention, a car fitted with modern types of carbureter can be run considerably farther than is possible in using the same petrol without the addition of hydrogen. The addition of 1/500 part of a cubic foot of hydrogen per mile per horsepower to the ordinary carbureter mixture together with additional air sufficient for the substantially complete combustion of the fuel gives a very marked improvement in mileage.

A suitable apparatus for carrying out this operation is shown diagrammatically on the accompanying drawing in which—

A is a tank containing liquid-fuel hydrogenated or not, which tank is connected through a carbureter B to the induction pipe C which leads to the engine D.

Within the induction pipe a nozzle $e$ is fitted which is connected with a cylinder E of compressed hydrogen gas, the nozzle being directed toward the cylinder of the motor D and the supply of hydrogen thereto being controlled by a valve $e^1$. A second nozzle $f$ also directed toward the cylinder of the motor is fitted within the induction pipe C through which second nozzle $f$ air is drawn from the atmosphere in quantity capable of being regulated by a valve $f^1$.

We claim:

1. A mixture for supplying internal combustion engines consisting of a finely subdivided fuel component, air in excess of the amount required for the full combustion of such fuel, the excess being sufficiently large to render the mixture not readily ignitible under normal conditions, and an amount of hydrogen sufficient to restore ready ignitibility.

2. A mixture for supplying internal combustion engines consisting of a combustible vapor, air in excess of the amount required for the full combustion of such vapor, the excess being sufficiently large to render the mixture not readily ignitible under normal conditions, and an amount of hydrogen sufficient to restore ready ignitibility.

3. A mixture for supplying internal combustion engines consisting of a hydrocarbon vapor, air in excess of the amount required for the full combustion of such vapor, the excess being sufficiently large to render the mixture not readily ignitible under normal conditions, and an amount of hydrogen sufficient to restore ready ignitibility.

In testimony whereof we have signed our names to this specification in the presence of two subscribing witnesses.

GEORGE EDWARD HEYL.
THOMAS THORNE BAKER.

Witnesses:
T. A. HEARSON,
J. PHILLIPS CRAWLEY.

Copies of this patent may be obtained for five cents each, by addressing the "Commissioner of Patents, Washington, D. C."